(12) United States Patent
Sakai et al.

(10) Patent No.: US 7,730,507 B2
(45) Date of Patent: Jun. 1, 2010

(54) BROADCAST RECEIVING APPARATUS AND STARTING METHOD THEREOF

(75) Inventors: Takeshi Sakai, Yokohama (JP); Katsunobu Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 377 days.

(21) Appl. No.: 11/748,108

(22) Filed: May 14, 2007

(65) Prior Publication Data

US 2008/0052740 A1 Feb. 28, 2008

(30) Foreign Application Priority Data

Aug. 25, 2006 (JP) .............................. 2006-228804

(51) Int. Cl.
*H04H 60/32* (2008.01)
(52) U.S. Cl. ......................... 725/14; 348/730
(58) Field of Classification Search .................. 348/730
See application file for complete search history.

(56) References Cited

U.S. PATENT DOCUMENTS

| | | | |
|---|---|---|---|
| 5,479,219 A * | 12/1995 | Aihara | 348/730 |
| 6,518,561 B1 | 2/2003 | Miura | |
| 6,636,026 B1 * | 10/2003 | Nomoto | 323/318 |
| 2005/0281531 A1 | 12/2005 | Unmehopa | |
| 2006/0066757 A1 * | 3/2006 | Numata et al. | 348/730 |

FOREIGN PATENT DOCUMENTS

| | | |
|---|---|---|
| JP | 2005-019185 | 1/2005 |
| JP | 2005-191815 | 7/2005 |
| JP | 2005-191937 | 7/2005 |
| JP | 2007-214983 | 8/2007 |
| WO | WO 2007/026532 | 3/2007 |
| WO | WO 2007/026615 | 3/2007 |

* cited by examiner

*Primary Examiner*—Brian T Pendleton
*Assistant Examiner*—Cai Chen
(74) *Attorney, Agent, or Firm*—Antonelli, Terry, Stout & Kraus, LLP.

(57) ABSTRACT

For providing a broadcast receiving apparatus and a method for staring thereof, suppressing electric power consumption therein, under waiting condition, irrespective of mounting a constituent part requiring a long time for starting up, according to the present invention, within a broadcast receiving apparatus, detection is made, always, upon an approach of a human being, by means of a human sensor 40 and a sub-CPU 60, under the condition that a power plug 75 is inserted into a commercial electric power source, so as to control supply of electric power form a main electric power source unit to each of portions of that apparatus. Thus, prior to startup of that apparatus through a main switch 22 and a remote controller 30, a constituent portion (i.e., a video processing portion 200), being made up with a CPU and/or a digital LSI, installing OS therein and talking time for startup thereof, is started up, in advance, so as to bring it into awaiting condition; thereby shortening or reducing the waiting time after the startup of the apparatus with suppressing the electric power consumption under the waiting condition thereof.

15 Claims, 5 Drawing Sheets

BROADCAST RECEIVING APPARATUS AND STARTING METHOD THEREOF

BACKGROUND OF THE INVENTION (1) Field of the Invention

The present invention relates to a broadcast receiving apparatus for receiving a television broadcasting signal and a radio broadcasting signal, and it relates, in particular, to a broadcast receiving apparatus for receiving the broadcasting signal(s) and a method for starting thereof, with treating a predetermined process upon the broadcasting signal waves, which are received by means of a signal processing device, including a CPU in a portion thereof.

(2) Description of the Related Art

In television broadcasting, in recent years, there are provided services of various kinds of methods, such as, terrestrial digital broadcasting, digital cable broadcasting, etc., in addition to the conventional analog broadcasting of NTSC method. Also, accompanying with this, for the broadcast receiving apparatus, further, it is also required to receive the digital broadcasting, in addition to the conventional analog broadcasting, and for that reasons, proposal is made on a broadcast receiving apparatus executing various kinds of processes therein, including, such as, tuning, waveform processing, etc., for example, with using a CPU installing OS therein and/or a digital LSI, and/or it is in practical use thereof.

As an example of this, by Japanese Patent Laying-Open No. 2005-191937 (2005), for example, is already known a receiving apparatus for enabling to receive multi-method broadcastings therewith, comprising a first CPU for controlling the tuning and demodulation of analog broadcasting signal, the video signal processing, and output of the video signal, a second CPU for controlling the tuning and demodulation of digital broadcasting signal, the video signal processing, and output of the video signal, and a switch for changing over the outputs of video signals, i.e., between the analog broadcasting signal and the digital broadcasting signal.

BRIEF SUMMARY OF THE INVENTION

However, with a broadcast receiving apparatus, which is also receivable of the digital broadcasting signal, in addition to the analog broadcasting signal, though it was already mentioned in the Patent Document 1 mentioned above, it is already known that it takes times for receiving the digital broadcasting signal, in particular, just after turning ON an electric power of a set, until when it displays an image on a screen after receiving a channel, comparing to the receiving of the conventional analog broadcasting signal.

Thus, as was mentioned in the above Japanese Patent Laying-Open No. 2005-191937 (2005), so-called a digital home equipment, such as, a receiver enabling to receive the analog and the digital broadcasting signals, in recent years, for example, loads or mounts a CPU and/or a digital LSI installing OS therein, and therefore, as a system control thereof, it is necessary to execute downloading of microcode for each device and initial setup, by downloading OS and extending the compressed data, after boot-up of the CPU by turning ON the power source of that apparatus. For this reason, it consumes much times for startup of the system (for example, about 10 seconds or more). And therefore, the waiting time until display on the screen after turning ON the power source of this set results into a cause of irritating a viewer, and an improvement of this is waited for.

However, the receiving apparatus for enabling to receive multi-method broadcastings known by the Japanese Patent Laying-Open No. 2005-191937 (2005), since it was accomplished by taking the fact into the consideration, that a common one is broadcasted at same hours, between the program on digital broadcast and the program on NTSC analog broadcast, wherein the first CPU is able to display a message on the screen during the time when the second controller portion (i.e., CPU) is preparing an output of the digital broadcast, by exchanging the switch mentioned above upon basis of an electronic program information obtained from the digital broadcast (i.e., by outputting the program of the analog broadcast being short in the starting time thereof, prior to the program of the digital broadcast having the long starting time. Thus, with this, it is tried to reduce the time waiting for display on the screen.

However, with the conventional technology mentioned above, as is apparent from the details thereof, since it is achieved upon an assumption of coexistence of the programs on the digital broadcast and also the programs on the analog broadcast, therefore it is impossible to deal with digitization (i.e., stoppage of the analog broadcast) of all television broadcasts, since the analog broadcast will not exist no more in the near future (i.e., starting from the year 2011).

The present invention is still effective even in case of shifting into the digital broadcast, and in particular, an object thereof is to provide a broadcast receiving apparatus and a method for staring thereof, for enabling to shorten the waiting time after starting of that apparatus, irrespective of mounting the CPU and/or the LSI installing the OS therein, as well as, suppressing consumption of electric power during when the apparatus is in waiting condition.

Thus, according to the present invention, there is provided a broadcasting apparatus, comprising: a receiving portion, which is configured to receive a signal broadcasted; a video information processing portion, which is configured to produce a video signal by conducting a predetermined process upon the broadcasting signal received by said receiving portion; a display portion, which is configured to display the video signal produced within said video information processing portion; an electric power source apparatus, which is configured to supply predetermined electric powers to each of portions mentioned above; an electric power controller portion, which is configured to control condition of the electric power conditions of said each of portions mentioned above under waiting condition; and a proximity detector portion, which is configured to detect an approach of a human being to said detector portion, wherein said video information processing portion includes, at least in a portion thereof, a portion taking time for starting up thereof, and said electric power controller portion controls the supply of electric power from said electric power source to that portion taking time for starting up thereof within said video information processing portion, upon detection of an approach of the human being by said proximity detector portion.

Also, according to the present invention, within the broadcasting apparatus, as described in the above, preferably, the portion taking time for starting up thereof includes a CPU installing OS therein, or said electric power source apparatus has a first condition for supplying electric power to said electric power controller portion and said proximity detector portion, a second condition for supplying electric power to the portion taking time for starting up thereof within said video information processing portion, in addition to said electric power controller portion and said proximity detector portion, and a third condition for supplying electric power to said each of portions of said broadcasting apparatus. Further, according to the present invention, preferably, said electric power source apparatus is shifted into the third condition for supplying electric power to said each of portions of said broadcasting apparatus, when starting the main switch of said broadcasting apparatus, and moreover, said electric power source apparatus is in the first condition of supplying electric power to said electric power controller portion and said proximity detector portion, under a waiting condition prior to startup of the main switch of said broadcasting apparatus, and also, said electric power source apparatus comprises a connector portion to be connected with a commercial power source, and always supplies electric power to said electric power controller portion and said proximity detector portion, accompanying with connection of that connector portion with said commercial power source. In addition thereto, according to the present invention, within the broadcasting apparatus, as described in the above, said proximity detector portion detects the approach of the human being to said detector by detecting physical change within a space where said broadcasting apparatus is set up, and said proximity detector portion is a camera portion, which is attached on a portion of said display portion, for example.

Further, according to the present invention, also for accomplishing the object mentioned above, there is also provided a method for starting a broadcast receiving apparatus, comprising a receiving portion, which is configured to receive a signal broadcasted, a video information processing portion, which is configured to produce a video signal by conducting a predetermined process upon the broadcasting signal received by said receiving portion, a display portion, which is configured to display the video signal produced within said video information processing portion, and an electric power source apparatus, which is configured to supply predetermined electric powers to each of portions mentioned above, wherein said video information processing portion includes, at least in a portion thereof, a portion taking time for starting up thereof, comprising the following steps of: detecting an approach to said apparatus; and supplying electric power from said electric power source apparatus to the portion taking time for starting up thereof within said video information processing portion, depending upon the approach of said human being to said apparatus, thereby to shift into a waiting condition. And, according to the present invention, within the method for starting the broadcast receiving apparatus, as described in the above, preferably, under said waiting condition is conducted a startup operation upon a CPU installing OS therein, included within the portion taking time for starting up thereof.

As was mentioned above, with the broadcast receiving apparatus and the method for starting thereof, according to the present invention, there can be obtained an effect superior from a practical viewpoint, i.e., enabling to suppress the consumption of electric power during the apparatus is in the waiting condition, while shortening the waiting time after starting up that apparatus, irrespective of existence of the CPU and/or the digital LSI, installing OS therein, in other words, portions of taking time for starting up.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 2:
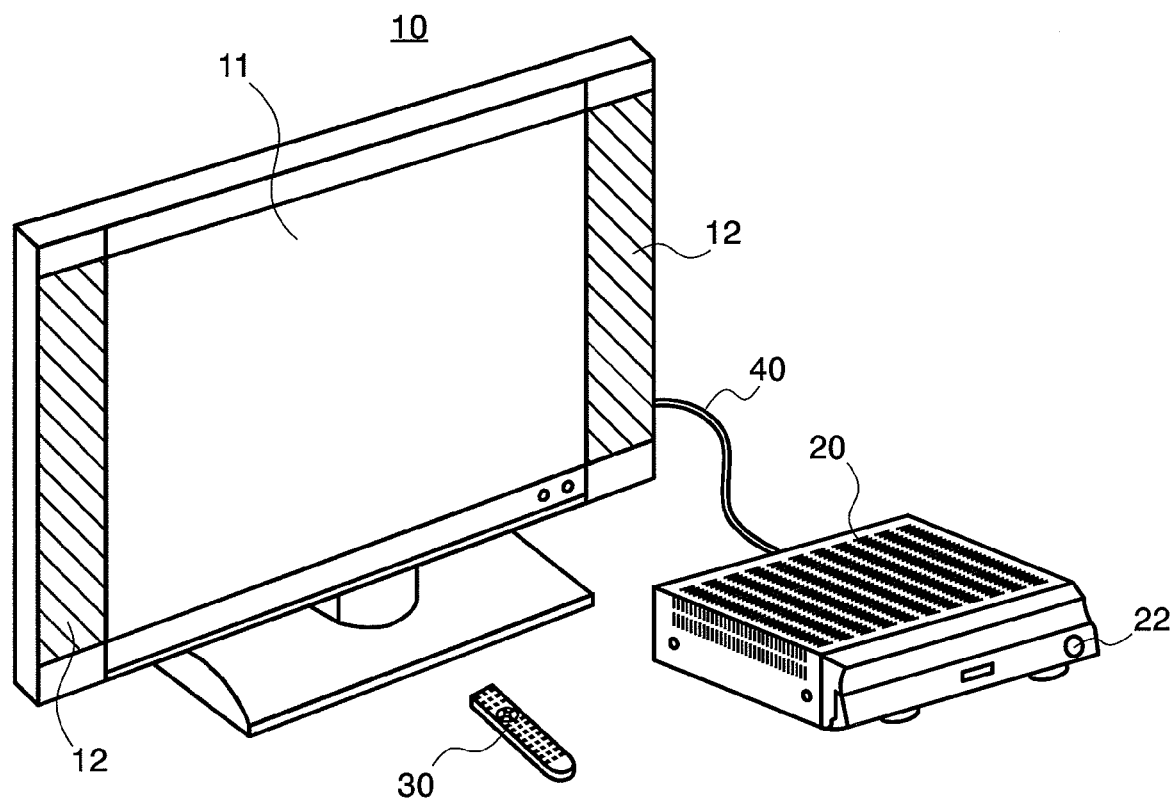
FIG. 2 is a perspective view of an outlook of the entire of the broadcast receiving apparatus mentioned above.

First of all, FIG. 2 attached herewith is a view for showing the entire structures of a broadcast receiving apparatus for receiving a digital broadcasting signal, so as to display it, according to the present invention. Further, in this embodiment, mentioning will be made upon an example of applying the present invention, in particular, into a broadcast receiving apparatus, for enabling to receive various kinds of services of the digital method, such as, the terrestrial digital broadcasting, the digital cable broadcasting, etc., i.e., so-called a television receiver apparatus, for example.

In this FIG. 2, as will be also mentioned later, a broadcast receiving apparatus 20 (i.e., being called by a tuner portion or a control box) comprises a tuner therein, for receiving a television broadcasting signal, and it is able to receive any one or an arbitrary combination of a digital BS/CS broadcasting signal, a terrestrial digital broadcasting signal, and a digital cable broadcasting signal, or all of those broadcasting signals. Also, as will be also mentioned later, this broadcast receiving apparatus may build a hard disk drive (HDD) and/or a digital video player/recorder (so-called, a DVD player/recorder) within an inside thereof, or it may be attachable with those, externally, outside that apparatus. Further, it may have input terminals and output terminals for a video signal and a component signal.

On the other hand, a display portion 10, in particular, a display panel 11 thereof is built up with a liquid crystal panel, a PDP or a FED, etc., and any one of them is connectable with the receiving apparatus 20 mentioned above. However, hereinafter, explanation will be made with an assumption that either the liquid crystal panel or the PDP is used to be the display panel 11. Also a reference numeral 12 in the figure depicts speakers for outputting audio therefrom. In addition thereto, a reference numeral 30 in the figure depicts so-called a remote controller, to be used for a user to control the receiving apparatus 20 mentioned above.

Between the receiving apparatus 20 mentioned above and the display portion 10, electrical connection is made through a means for electrically connecting, i.e., a cable 40. However, this cable 40 includes a video line and an audio line for supplying a video signal and an audio signal (i.e., so-called the video signal) to the display panel 10, a communication line for transmitting a control signal, etc., from the receiving apparatus 20 to the display portion 10, and also an electric power line for supplying driving electric power from an electric power portion of the above-mentioned receiving apparatus 20, which will be mentioned later.

Figure 1:
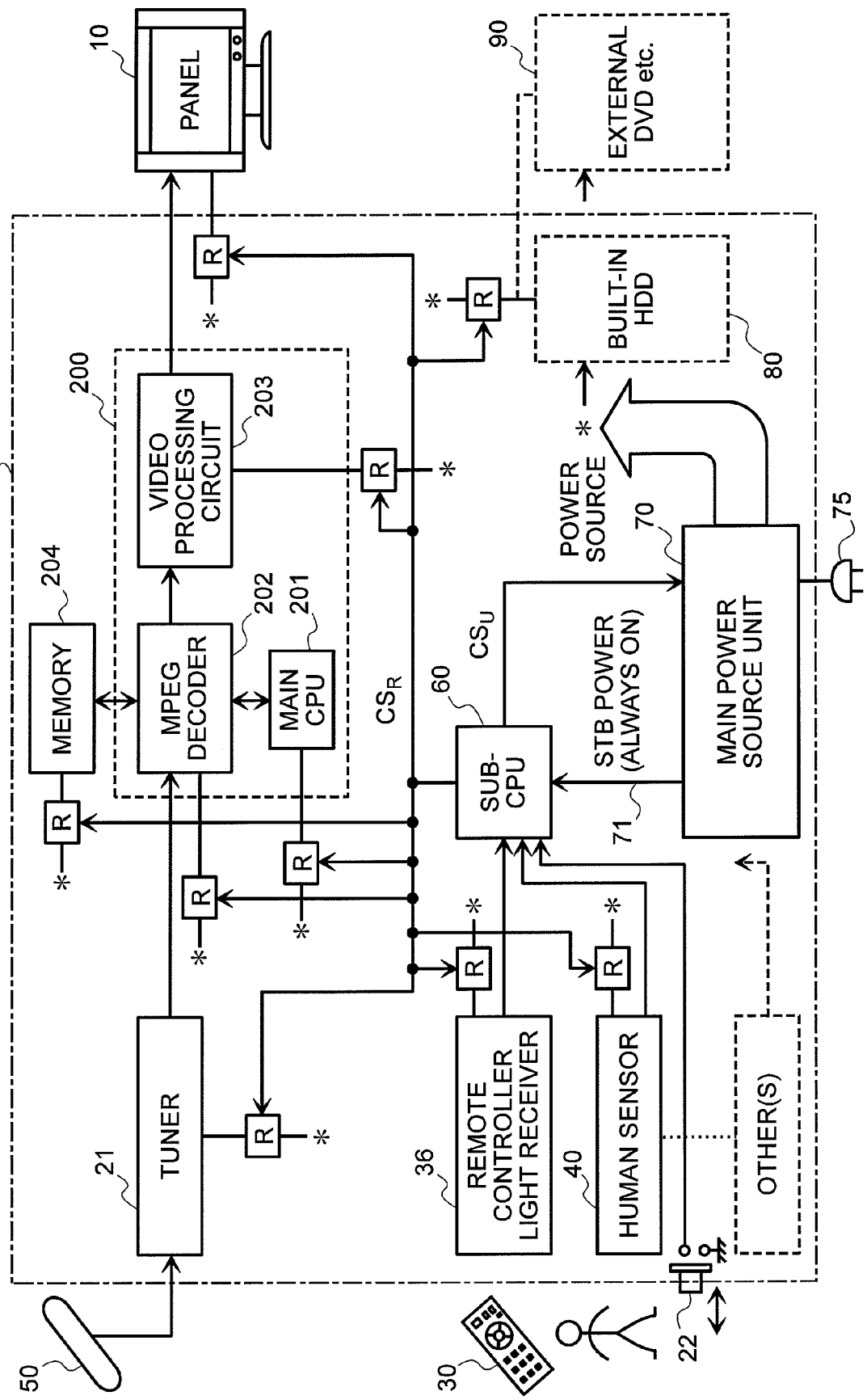
FIG. 1 is a block diagram for showing the detailed circuit configuration of a broadcast receiving apparatus, according to an embodiment of the present invention.

Next, in FIG. 1 attached herewith is shown the details of the inner structures of the receiving apparatus 20 mentioned above. As is apparent from this figure, the receiving apparatus 20 comprises, within an inside thereof, a (digital) tuner circuit 21 for selecting a desired one among the broadcasting signals, which are received by means of an external antenna 50, and also a video processing portion 200, being built up with one (1) chip LSI, for example, which mounts a main CPU 201 in a portion thereof, as a main controller circuit for controlling that apparatus, as a whole thereof. Further, in the structures thereof, this video processing portion 200 further comprises a MPEG decoder 202 and also a video processing circuit 203, etc., for example, within an inside of that chip, as well as, the main CPU 201 therein. However, this main CPU 201 has functions of tuning of the digital tuner 21 and also controlling the respective processing circuits, and also various kinds of functions for outputting a desired video signal. Also, this main CPU 201 is also able to store electronic program information obtainable from the digital broadcast into an electronic program information storage portion provided within the built-in HDD or the like, which will be explained later, or to manage the program information of the digital broadcasts.

And, when receiving the digital broadcast, tuning of RF modulation waves inputted from the antenna 50 mentioned above is made by the main CPU 201 controlling the (digital) tuner circuit 21, upon the desired channel, and the video data is extracted from it, so that the video data extracted is outputted to the video processing portion 200. Further, in more details thereof, but not shown herein, an IF signal outputted from this tuner circuit 21 is demodulated, in particular, a digital modulation waver thereof within a digital modulator circuit, and is outputted into a transport decoder to be a transport data. And, in this transport decoder, from the transport data is extracted (MPEG) video data, thereby to output the extracted video data into the video processing portion 200.

In this video processing portion 200, also under the control of the main CPU 201 mentioned above, the MPEG decoder 202 treats a MPEG decoding process upon the video data, which is obtained from the tuner circuit 21 and treated with MPEG processing, and further in the video processing circuit 203, the video data treated with the MPEG decoding process is outputted into the display panel (i.e., the display portion) 10, in the form of a predetermined video signal required by the display portion. However, in this instance, it is also possible to record that video data into the built-in HDD 80 shown in the lower right portion in FIG. 1 or the external DVD recorder 90, etc. Also, a reference numeral 204 in the figure depicts so-called a memory, as a memory device, which is provided separate from one (1) chip LSI (i.e., the video processing portion 200) mentioned above, to be used when the MPEG decoder 202 executes the process thereof.

However, in the above, the main CPU 201 mentioned above, for controlling the operations of the apparatus, as a whole thereof, including those of the tuner circuit 21 and the video processing portion 200 mentioned above, it is a CPU installing OS therein. For this reason, it is necessary to execute downloading of micro-code for each device and initial setup, by downloading the OS stored within the memory and also extending the compressed data, after boot-up of the CPU by turning ON the power source of that apparatus. And for starting up of such system, there are cases of taking about 10 seconds or more, sometimes.

Also, within the receiving apparatus 20 mentioned above, as is shown in the left-hand side in FIG. 1, there are provided a remote controller light receiver portion 36, for receiving a control signal (for example, a signal of infrared ray) from the remote controller 30, for a user to control the operation of the apparatus mentioned above from a remote, further a human sensor 40 for detecting an approach of a human being to a television receiver, i.e., the display system (i.e., including the receiving apparatus 20 and the display panel (display portion) 10), and further a main switch 22 for building up a switch for the said display system as a whole, etc., being disposed on the side of that panel.

And, in the receiving apparatus 20, according to the present invention, as well as the main CPU 201 mentioned above, there is further provided a sub-CPU 60, separately; i.e., a sub-controller circuit being smaller in the consumption of electric power than the main CPU 201. And, as is apparent from the figure, the sub-CPU 60 is connected to a STB (i.e., standby) power terminal 71 of a main power source unit 70 provided within that apparatus. Further, this STB (standby) power terminal 71 is a terminal, being turned into ON condition always during a time-period when a power plug 75 is inserted into (connected with) a commercial power source, which is connected at a tip of a power cable 72 extending from the main power source unit 70, i.e., the electric power source portion of the receiving apparatus 20. For this reason, to this CPU 60 is always supplied necessary electric power (from 1 watt to several watts, approximately).

Also, though not shown in the figure, but the main power source 70 generates various kinds of power-supply voltages desired, with using electric power switching elements, etc., for example, and it also starts supplying the various kinds of power-supply voltages desired to predetermined power terminals, upon basis of a control signal ($CS_U$) from the sub-CPU 60 mentioned above. However, in this FIG. 1, for the purpose of easy explanation thereof and avoiding from complication, those power terminals are shown by "?" collectively. Explaining in more details thereof, those power terminals "?" are connected with the above-mentioned tuner circuit 21, the main CPU 201, the MPEG decoder 202, the video processing circuit 203, and the above-mentioned display 10 and the panel 11 thereof, and further with the built-in HDD 80 and the external DVD recorder 90 mentioned above, respectively, through regulators R, R . . . (such as, a semiconductor switching circuit, for example), enabling ON/OFF of the power supply, i.e., in such a manner that each can be turned ON/OFF, electrically. And, to the control terminals of those regulators R, R . . . are connected a control signal (CSR) from the sub-CPU 60 mentioned above, respectively, and ON/OFF of the regulators are controlled therewith.

Thus, with the constructions of the receiving apparatus 20 mentioned above, the above-mentioned sub-CPU 60, which is connected with the STB (standby) power terminal 71 of the main power source unit 70 is turned into ON condition through insertion (or connection) of the power plug 75 into the commercial power source, and as a result thereof, the sub-CPU 60 is in the condition of enabling to execute a predetermined process, always, irrespective of presence of an instruction of power ON from the main switch 22 or the remote controller 30 mentioned above.

Figure 3:
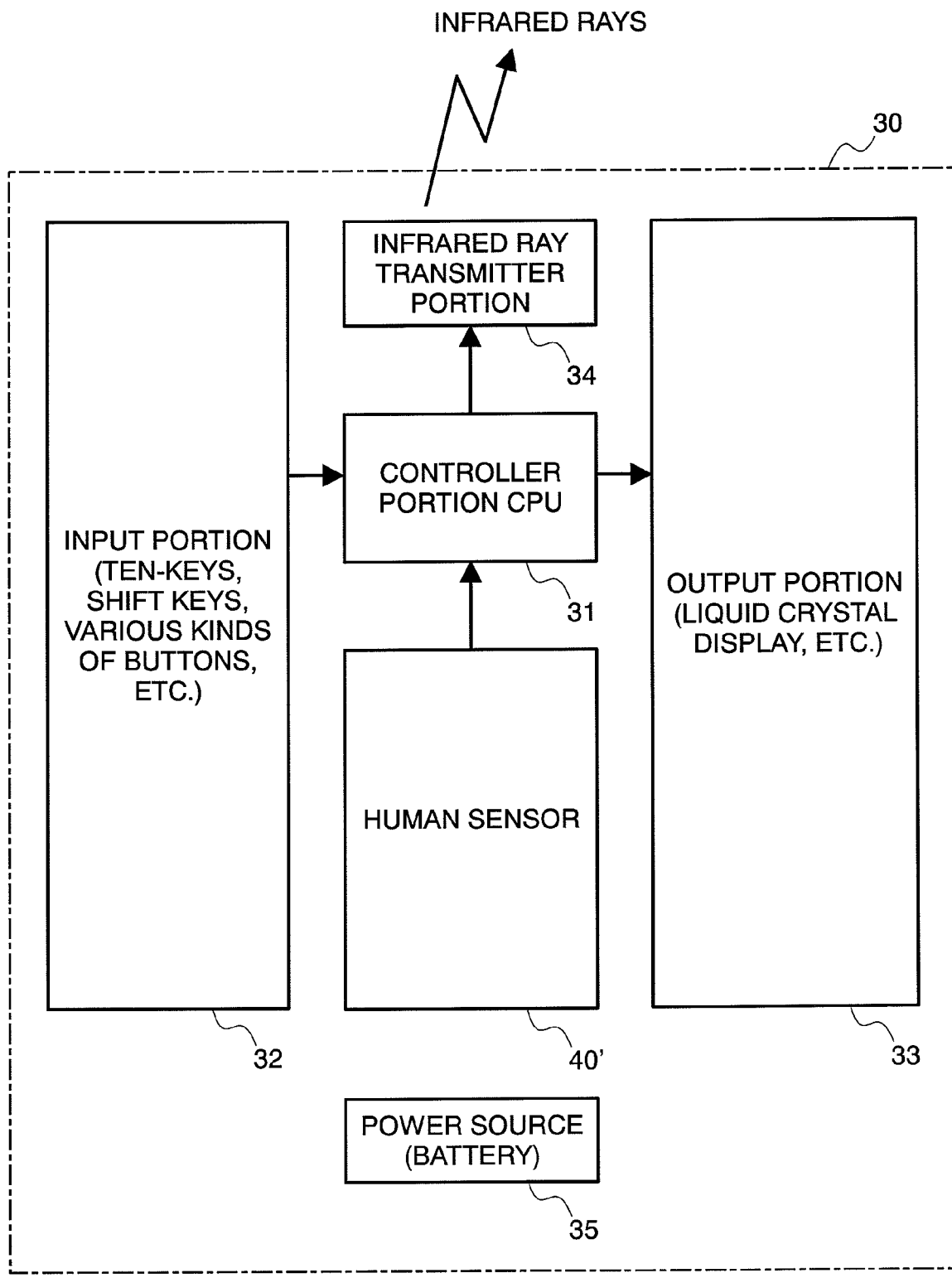
FIG. 3 is a block diagram for showing an example of the inner structures of a remote controller, which builds up the broadcast receiving apparatus mentioned above.

Further, in FIG. 3 attached herewith is shown an example of the inner structures of the remote controller 30 mentioned above. Thus, as is apparent from this figure, this remote controller 30 comprises at least a CPU 31 for building up a controller portion, within a housing made of a plastic, for example, and also an input portion 32 having ten keys, shift keys (cursor keys) and various kinds of buttons, for example, for inputting various kinds of instructions from an operator (or a viewer) to the CPU 31 mentioned above, an output (display) portion 33 made of a liquid crystal display or the like, for example, for displaying thereon the outputs (various kinds of displays) from that CPU 31, and an infrared ray transmitter portion 34 for converting the various kinds of instructions, which are inputted by the viewer, into the infrared ray signals, in accordance with the control signals outputted from the CPU 32 mentioned above, thereby transmitting them to the receiving apparatus 20. And also, this shows an example of the remote controller 30, also providing a human sensor 40' for detecting an approach of a human being to the television receiver, within an inside thereof, through detection of being held on a hand of human being, for example, in addition to the above-mentioned human sensor 40, which is provided on a side of the receiving apparatus 20. Also, a reference numeral 36 in the figure depicts a power source made from a battery for supplying necessary electric power to each of portions, which build up that remote controller 30.

Following to the above, detailed explanation will be made upon the operations within the receiving apparatus 20, according to the present invention, the detailed structures thereof were already explained in the above, and in particular, the operations after setting up the apparatus at a predetermined location, such as, within a room, for example, starting from the condition of inserting (or connecting) the power plug 75 of the main power source unit 70 into the commercial power source up to when the viewer turns the power of the apparatus ON through the main switch 22 or the remote controller 30 (i.e., the power button of the remote controller), by referring to the flowchart shown in FIG. 4 attached herewith. However, the processes shown below are executed by the sub-CPU 50 mentioned above, which is always in the operating condition during the time-period when the power plug 75 is inserted (or connected) into the commercial power source.

Figure 4:
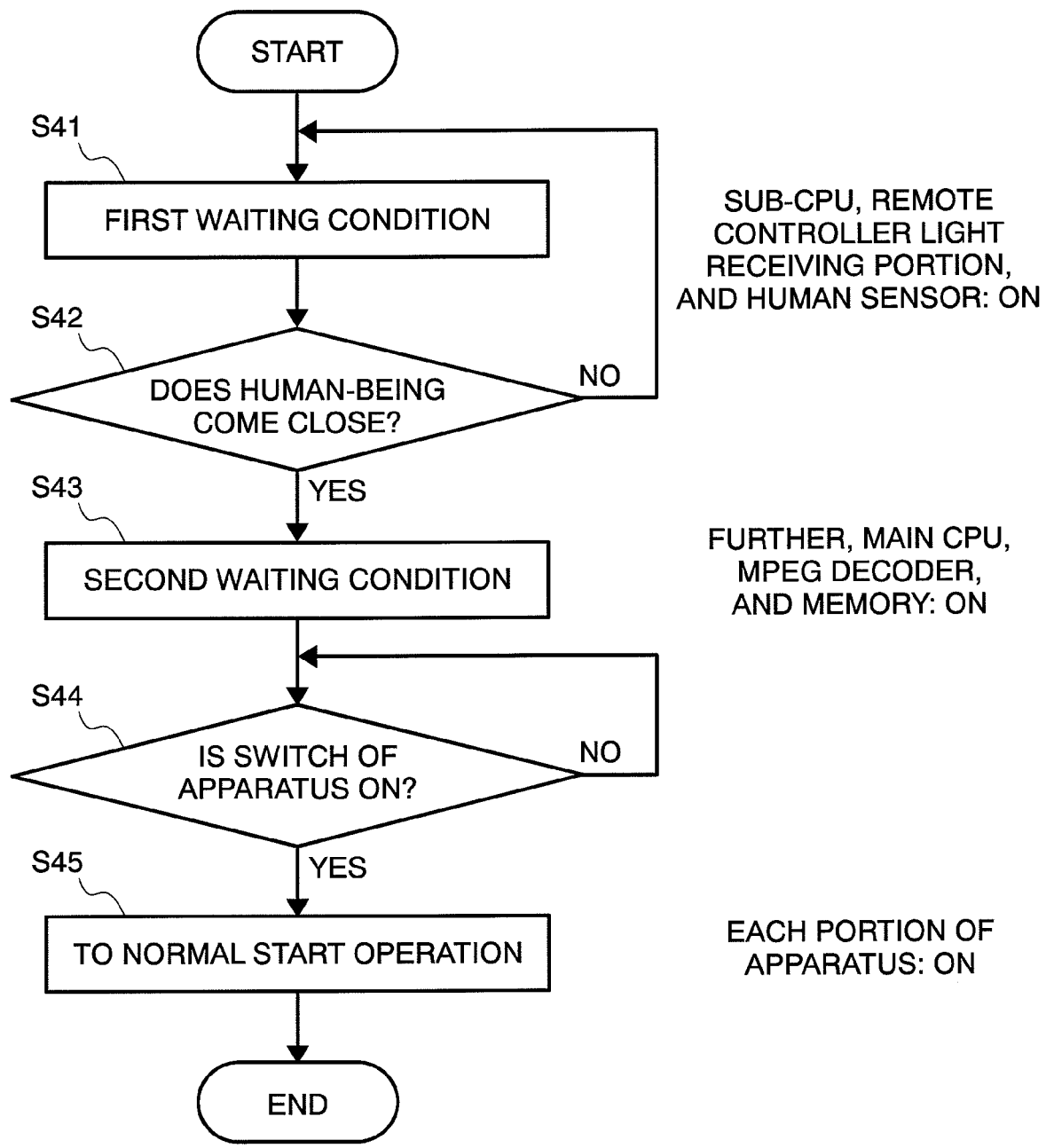
FIG. 4 is a flowchart for explaining the operations within the broadcast receiving apparatus mentioned above, in particular, when starting up.

In this FIG. 4, when staring the process, the sub-CPU 60 mentioned above sets the television receiver, including the receiving apparatus 20 and the display panel (display portion) 10, into a first waiting condition (S41). Further, explaining this in more details thereof, under this first waiting condition, supply of the power from the main power source unit 70 is started, in addition to the sub-CPU 60 mentioned above, further to the remote controller light receiver portion 36 and the human sensor 40, and thereby brining those remote controller light receiver portion 36 and the human sensor 40 also into the waiting conditions. Thus, under this first waiting condition, the power is supplied to the sub-CPU 60, the remote controller light receiver portion 36, and the human sensor 40, so as to enable the operations thereof.

Thereafter, the sub-CPU 60 makes determination on if a human being approaches or comes close to the television receiver or not (i.e., including the receiving apparatus 20 and the display panel (the display portion) 10 therein), with an aid of the detection signal, for example, from the human sensor 40, and/or that from the human sensor 40' provided with the remote controller 30 (S42), and as a result thereof, in case when determination is made that no human being approaches (i.e., "NO" in the figure), the process is turned back to the step S41 mentioned above, again. Thus, this is repeated until when detecting that a human being approaches thereto (i.e., "YES" in the figure).

And, in case when detecting approach of the human being in the determining step S42 mentioned above (i.e., "YES" in the figure), the sub-CPU 60 mentioned above brings the television receiver, including the receiving apparatus 20 and the display panel (the display portion) 10, into a second waiting condition (S43). Thus, under this second waiting condition, supply of the electric power from the main power source unit 70 is started, at least, to the main CPU 201 mentioned above, and further to the constituent parts necessitating a relatively long time for starting thereof, including the MPEG decoder 202 and the memory 204 thereof, for example. In more details thereof, as was mentioned above, since the main CPU 201 executes the downloading of micro-code for each device and the initial setup, by downloading the OS stored within the memory and also extending the compressed data, after being boot-up thereof, therefore it consume a time, for example, about ten (10) seconds or more. However, according to the present embodiment, as was mentioned above, the apparatus starts various kinds operations necessary for of the starting, including the boot-up mentioned above, at the time-point when detecting the approach of the human being (i.e., the second waiting condition). And, after completing the starting operations, the apparatus is in the waiting condition. Under this second waiting condition, since no image is displayed on the display panel, no electric power is supplied to the display panel 11 and the video processing circuit 203, etc.

Thereafter, the sub-CPU 60 further makes determination on if the viewer turns ON or not the switch for operating the apparatus (S44), for example, through pushing-down of the power ON button of the remote controller or the main switch 22 mentioned above. As a result thereof, in case when determining that the switch of the apparatus is turned ON (i.e., "YES" in the figure), the normal starting operation is executed (S45). Thus, in the television receiver mentioned above, supply of the electric power from the main power source unit 70 is started, further, to the constituent parts necessary for the operations thereof, including the constituent parts that are not yet started under the first waiting condition and the second waiting condition, for example, the display panel (the display portion) 10, the video processing circuit 203, and the tuner circuit 21, etc. Further, it is also possible to start supply of the necessary electric power, at the same time, to the built-in HDD 80 and the external DVD recorder 90 mentioned above.

Thus, with the starting operation within the television receiver, according to the present embodiment mentioned above, startup is made in advance, by supplying the electric power, in particular, to the constituent parts needing a relatively long time for starting thereof, such as, the CPU and/or the digital LSI installing OS therein, for example, under the second waiting condition, i.e., at the time-point when detecting the approach of the human being, the viewer, to the apparatus, and thereafter, the electric power is supplied to the constituent parts necessary for other operations of the apparatus, under the condition where the switch actually operating the apparatus is turned ON; therefore it is possible to shorten the waiting time after the starting of the television receiver. Thus, according to the present embodiment, it is possible to shorten the time from the time when turning the power ON of the remote controller up to the time when an actual image is displayed on the display panel 11, greatly, under the waiting condition of the display apparatus 10, for example, from about 10 seconds with the conventional apparatus down to 1 to 2 seconds.

However, in that instance, for example, the consumption of electric power within the sub-CPU 60, the remote controller light receiver portion 35, and the human sensor 40, which are started under the first waiting condition mentioned above, is equal or less than 1 W, and further, is 5-10 W at the maximum, even including the power consumption within the MPEG decoder 202 and the memory 204 thereof; i.e., it is very small comparing to the power consumption 150-200 W of the LCD (liquid crystal display) or the power consumption 200-300 W of the PDP (i.e., the plasma display panel), building up the display panel (the display portion) 10. Therefore, it is also possible to suppress the power consumption within the broadcast receiving apparatus, in particular, during the waiting time thereof.

Although the explanation in the above was made that, in addition to the main CPU 201 mentioned above, the MPEG decoder 202 and the memory 204 thereof are also the constituent parts to be started up under the second waiting condition, however the present invention should not be restricted only to this; i.e., it is also possible to start up as an unit, for example, if mounting the video processing circuit 203, etc., on one (1) piece of substrate (or one (1) chip), including those.

And, in the embodiment mentioned above, in case when determining that the switch of the apparatus is not turned ON (i.e., "NO" in the figure) as a result of the determination (S44), the apparatus waits as it is until when the switch thereof is turned ON. However, in the place of this, though not shown in the figure, it is also possible to provide a timer of several minutes, for example, so that it turns back, again, to the step S41 mentioned above, i.e., the first waiting condition, when that condition of not turning this switch ON (i.e., "NO" in the figure) exceeds the setup timer, and this may be preferable, in particular, for suppressing the consumption of electric power when it is under the waiting condition.

Following to the above, explanation will be made hereinafter, upon the human sensors 40 and 40' mentioned above. As is apparent from the above, in the present embodiment, the above-mentioned human sensors 40 and 40' are provided for detecting the fact that a human being, i.e., an operator (or the viewer) of the television receiver approaches to the apparatus, so as to start (i.e., power ON) that apparatus, in advance to the actual startup (i.e., the power ON) of the apparatus. For that reason, as such the human sensors can be adopted one for detecting change of electrostatic capacitance due to approach of the human being (i.e., a proximity switch of electrostatic capacitance method), one for detecting with using change of temperature due to approach of the human being (i.e., a thermo-sensor), and further one for detecting a touch on the remote controller 30 to be utilized for operation thereof, in many cases, as is shown in FIG. 3 mentioned above (i.e., a touch sensor), etc. Or, alternatively, in the place of those, it is also possible to dispose a set, such as, a light emitting diode (LED) of infrared rays or the like and a light receiving element thereof, for example, at a predetermined position (for example, at an entrance of the room where the television receiver is set up), thereby detecting the approach through interruption or shutoff of an optical path due to the human being. Thus, the human sensor for building up the proximity detection means detects physical changes within a space where the television receiver is set up, thereby detecting approach of the human being, i.e., the operator (or the viewer) to that apparatus.

Figure 5:
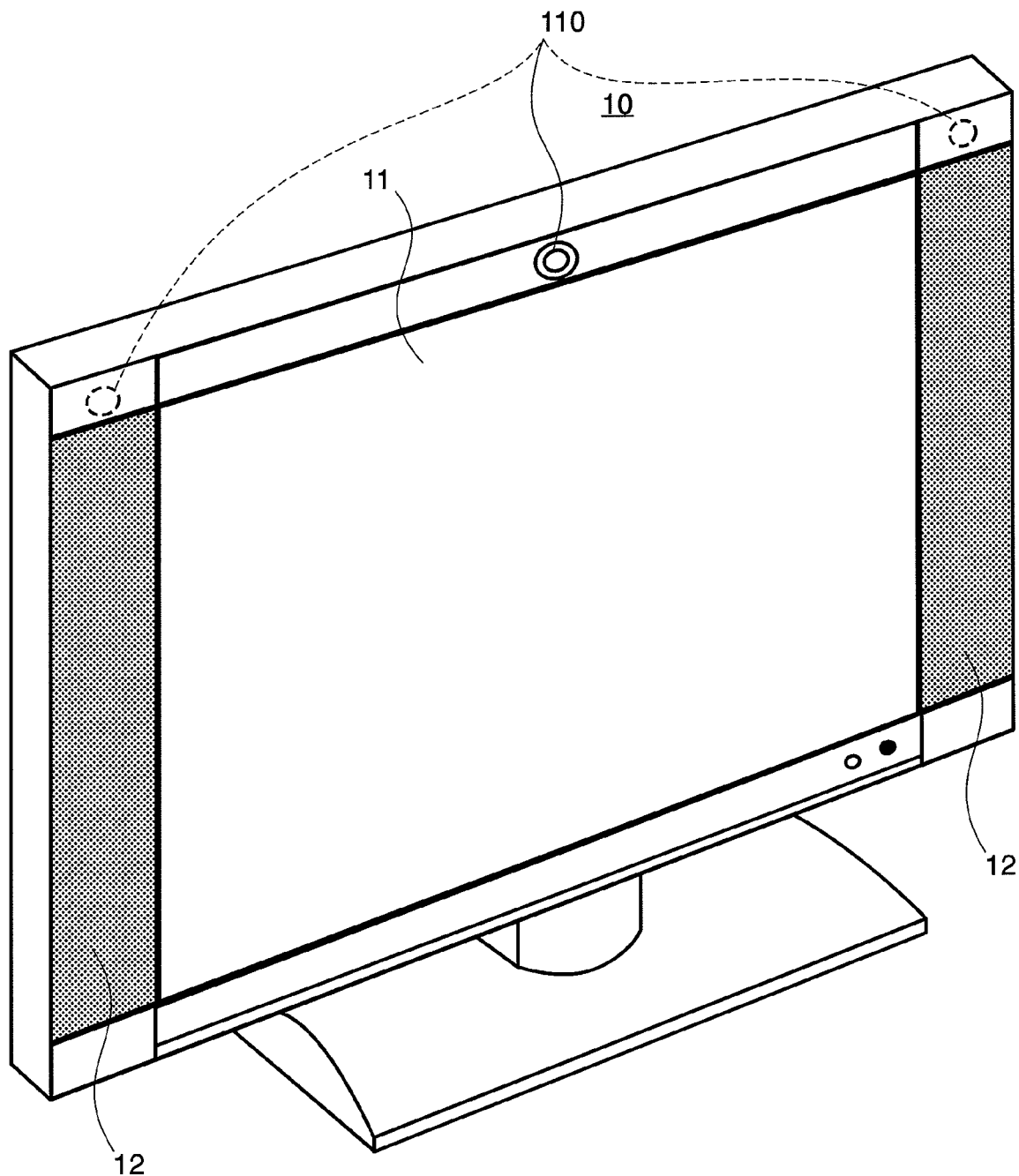
FIG. 5 is a perspective view for showing an example of an arrangement of a camera apparatus, which builds up a human sensor within the broadcast receiving apparatus mentioned above.

Further, for example, as is shown in FIG. 5 attached herewith, it is also possible to build up such the human sensor as mentioned above, by attaching a single or a plural number of camera apparatus(es), each of which is made up with a lens and a CCD element, etc., for example, at a portion of the television receiver, in particular, at a portion of the display panel (the display portion) 10 opposing to the viewer when viewing. However, in case when applying the camera apparatus(es) 110 as the human sensor, it is possible to detect approach of the human being, with much certainty, by detecting a skin color on an picture or image which is picked up. Further, the process for that is executed with an aid the sub-CPU 60 mentioned above, by inputting the picture picked up from the camera apparatus(es) 110. Also, the camera apparatus(es) may be attached at a portion of the receiving apparatus 20 mentioned above, for example, in the place of the display panel (the display portion) 10 mentioned above, in particular, on the panel thereof.

It is also possible to change the timing for shifting between the first and second waiting conditions, by changing the detection sensitivity of the human sensors 40 and 40' mentioned above. For example, if increasing the detection sensitivity of the human sensors 40 and 40', since by the sensors 40 and 40' it is possible to detect the existence of that user when she/he enters into the room where the display apparatus 10 is set up, it is possible to shift the apparatus from the first waiting condition into the second waiting condition, as quickly as possible. The detection sensitivity of the human sensors 40 and 40' may be shown on a menu screen on the display, so as to be changed by the remote controller through this menu screen.

Also, with the embodiment mentioned above, detection of approach of the human being to the display apparatus, by means of the human sensor(s) or the like, brings the apparatus to shift from the first waiting condition into the second waiting condition. However, the present invention should not be restricted to this. For example, detecting is made upon the present time, with using a timer, which is equipped with the display apparatus 10, inherently, and the display apparatus may shifted from the first waiting condition into the second waiting condition depending on that present time detected. For example, since the time zones when the viewer watches the television program are 6:00-8:00 and 18:00-24:00, in average, then as predetermined time zone for shifting into the second waiting condition are set 6:00-8:00 and 18:00-24:00, in advance. And, when the present time detected by the timer mentioned above enters into the time zones, which are set up in advance, in case where the display apparatus 10 is in the first waiting condition, then that display apparatus 10 is shifted, automatically, from the first waiting condition into the second waiting condition. On the contrary, when the present time detected by the timer comes out of the time zones, which are set up in advance, in case where the display apparatus 10 is in the second waiting condition, then that display apparatus 10 is shifted, automatically, from the second waiting condition I to the first waiting condition. Such the timer as was mentioned above may be built in the sub-CPU 60 or the main CPU 201, for example.

Also, this time zone may be freely settable, by the user. For example, on the display panel 11 is displayed a menu screen for time setup, so as to into the time zone from this menu screen. If that viewer watches the television program within a time zone 13:00-18:00, for example, the time 13:00 and the time 18:00 are inputted on the menu screen with using the remote controller 30. And, in case when the present time detected by the timer enters into the time zone 13:00-18:00, which is set up by the viewer, the display apparatus is shifted from the first waiting condition into the second waiting condition, automatically. On the contrary, where the display apparatus 10 is in the second waiting condition, that display apparatus 10 is shifted from the second waiting condition into the first waiting condition, automatically, in case when the present time detected by the timer mentioned above comes out of the time zone, which is set up by the viewer.

As was mentioned above, with shifting the apparatus into the second waiting condition during only the predetermined time zone with using the timer, it is possible to shorten the time from the waiting condition until the display operation, while suppressing the consumption of electric power under the waiting condition thereof, at a low cost, without provision of new elements, such as, the human sensor, etc. Further, also for the purpose of making the display apparatus acknowledgeable to be in the first waiting condition or in the second waiting condition, from an outlook thereof, there may be provided a display or light emitting element, such as, a LED, etc., for visually distinguishing the waiting condition thereof. For example, three (3) kinds of LEDs are provided, i.e., a green color LED, a red color LED, and a yellow color LED, for example, wherein the red color LED irradiates when the apparatus is in the normal operation condition, the red color LED irradiates when it is in the first waiting condition, and the yellow color LED irradiates when it is in the second waiting condition. Also, it is possible to provide of two (2) kinds of LEDs, i.e., a green color LED and a red color LED, wherein the green color LED irradiates when it is in the normal operation condition, the red color LED irradiates when it is in the first waiting condition, and the red color LED turns ON and OFF when it is in the second waiting condition.

Furthermore, connecting the display apparatus 10 with an air conditioner or a lighting apparatus within the room through a home network, thereby communicating with each other, it is possible to control shifting between the first waiting condition and the second waiting condition linking with the power switch of the air conditioner or the lighting apparatus. For example, when the user turns the light ON within the room where the display apparatus 10 is set up, a control signal is transmitted from the lighting apparatus, responding to the turning ON of the light, through the home network, to the sub-CPU 60 of the display apparatus 10. With this, the display apparatus 10 can be shifted from the first waiting condition into the second waiting condition in linkage with the turning ON of the lighting apparatus. In the similar manner, when turning the power of the air condition within the room into ON condition, the control signal may be transmitted from the air conditioner, responding thereto, to the sub-CPU 60 of the display apparatus 10 through the home network. With this, it is possible to execute that shifting mentioned above in linkage with the turning ON of the power of the air conditioner. With such the structures, it is possible to control shifting between the waiting conditions of the display apparatus 10, under the condition of high probability that the user views the display apparatus 10.

As was mentioned above, according to the present embodiment, the display apparatus 10 has the waiting conditions (i.e., the signal of the remote controller); thus, as the waiting operation modes, a first waiting operation mode, being a normal waiting operation mode, and a second waiting operation mode, though being larger in the consumption of electric power than the first waiting operation mode, but able to display an image thereon, quickly, when turning the power ON. And, according to the present embodiment, the time during when the second waiting operation mode is in effective, is restricted, appropriately, upon basis of the control signals or the like from the human sensor, the timer, the external equipments connected with the home network. With this, according to the present embodiment, it is possible to reduce or shorten the time from the turning ON of power until displaying of an image, but without increasing the electric power consumption, largely, during the time-period of the waiting condition (i.e., the waiting operation mode).

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A broadcast program receiving apparatus to display a program broadcast via a digital broadcasting signal, comprising:
   a first controller configured to control a waiting mode of the broadcast program receiving apparatus; and
   a second controller configured to be started up by a predetermined OS to control a processing of a received digital broadcasting signal via a decoder;
   a display portion, which is configured to display an image using a signal processed by the second controller;
   an electric power source unit which is configured to supply predetermined electric power;
   a remote control signal receiving portion, which is configured to receive a remote control signal for operating the display portion; and
   where the first controller being smaller in consumption of electric power than the second controller, and configured to control the electric power supplied from the electric power source unit, responsive to the remote control signal received by the remote control signal receiving portion,
   wherein the waiting condition in which an image is not displayed after stopping a supply of the electric power to the display portion, is controlled by the first controller, so as to be placeable into either of a first waiting condition or a second waiting condition,
   the first controller is controlled to be set in operation via supply of the electric power from the electronic power source unit thereto, under the first or second waiting condition,
   the electric power supplied from the power source unit is controlled, so as to supply the electric power to the remote control signal receiving portion, as well as, not to supply the electric power to the second controller including the decoder, under the first waiting condition, and
   the electric power supplied from the power source unit is controlled so as to supply the electric power to the remote control signal receiving portion and the second controller including the decoder, under the second waiting condition.

2. A display apparatus, comprising:
   a receiving portion, which is configured to receive a digital broadcasting signal;
   a decoder, which is configured to decode the digital broadcasting signal received by the receiving portion;
   a display portion, which is configured to display an image using a signal decoded within the decoder;
   an electric power source unit which is configured to supply predetermined electric power;
   a remote control signal receiving portion, which is configured to receive a remote control signal for operating the display portion;
   a main control circuit, which is configured to be started up by a predetermined OS to control parts of the display portion; and
   a sub-control circuit, being smaller in consumption of electric power than the main control circuit, which is configured to control the electric power supplied from the electric power source unit, responsive to the remote control signal received by the remote control signal receiving portion,
   wherein a waiting condition of the display apparatus in which an image is not displayed after stopping a supply of the electric power to the display portion, is controlled by the sub-control circuit, so as to be placeable into either of a first waiting condition or a second waiting condition,
   the sub-control circuit is controlled to be set in operation via supply of the electric power from the electronic power source unit thereto, under the first or second waiting condition, the electric power supplied from the power source unit is controlled, so as to supply the electric power to the remote control signal receiving portion, as well as, not to supply the electric power to the decoder and the main control circuit, under the first waiting condition, and the electric power supplied from the power source unit is controlled so as to supply the electric power to the remote control signal receiving portion, the decoder and the main control circuit, under the second waiting condition.

3. The display apparatus, as described in the claim 2, comprising:

a human sensor which detects an approach of a human being to the display apparatus, wherein under the first waiting condition, the apparatus is shifted from the first waiting condition into the second waiting condition when the human sensor detects the approach of the human being to the display apparatus.

4. The display apparatus, as described in the claim 3, wherein under the second waiting condition, the sub-control circuit is shifted from the second waiting condition into the first waiting condition when a predetermined time has elapsed without an operation for turning on a power button of the display apparatus.

5. The display apparatus, as described in the claim 3, wherein the human sensor is provided in a remote controller apparatus, which transmits a remote control signal in accordance with a user's operation.

6. The display apparatus, as described in the claim 3, wherein the detection sensitivity of the human sensor can be changed in accordance with a user's operation.

7. The display apparatus, as described in the claim 3, wherein the human sensor is a camera portion, which is attached on a portion of the display portion.

8. The display apparatus, as described in the claim 2, comprising:

a timer, which is configured to detect a present time, wherein under the first waiting condition, the apparatus is shifted from the first waiting condition into the second waiting condition, when the present time detected by the timer lies within a predetermined time range, and under the second waiting condition, the apparatus is shifted from the second waiting condition into the first waiting condition, when the present time does not lie within a predetermined time range.

9. The display apparatus, as described in the claim 8, wherein the predetermined time range can be changed in accordance with a user's instruction.

10. The display apparatus, as described in the claim 2, comprising:

a light emitting element which changes an emitting condition thereof depending on whether the display apparatus is in the first waiting condition or the second waiting condition, and wherein the light emitting element makes the display portion distinguishable whether the display apparatus is in the first waiting condition or the second waiting condition.

11. The display apparatus, as described in the claim 2, wherein information relating to a power-ON or power-OFF of an apparatus within a room, is input into the main control circuit through a home network, and when the information relating to the power-ON of the apparatus within a room is input into the main control circuit via the home network under the first waiting condition, the apparatus is shifted from the first waiting condition into the second waiting condition.

12. The display apparatus, as described in the claim 11, wherein the apparatus within the room, is a room lighting apparatus.

13. The display apparatus, as described in the claim 2, wherein when a power button of the display apparatus is turned ON under the first waiting condition or the second waiting condition, the sub-control circuit controls the electronic power source unit, so as to supply the electric power to the receiving portion and the display portion, so as to operate the display apparatus in a normal manner.

14. A waiting condition setting method for a broadcast receiving apparatus which is a display apparatus receiving and displaying a digital broadcast signal, and which includes a decoder configured to decode the received digital broadcast signal, a display portion configured to display an image using a signal decoded within the decoder, a remote control signal receiving portion configured to receive a remote control signal for operating the display apparatus, a main control circuit started up by a predetermined OS to control parts of the display portion, and a sub-control circuit, being smaller in the consumption of electric power than the main control circuit and configured to control electric power supplied from an electric power source unit upon a basis of the remote control signal received by the remote control signal receiving portion, wherein a waiting condition in which an image is not displayed after stopping the supply of the electric power to the display portion, is controllable so as to be settable into either a first waiting condition or a second waiting condition;

the waiting condition setting method comprising:

stopping, via the sub-control circuit during the first waiting condition, the supply of the electric power to the decoder and the main control circuit, but supplying the electric power to the remote control signal receiving portion to be operable to receive a remote control signal;

detecting a present time by a timer;

shifting from the first waiting condition into the second waiting condition when the present time detected by the timer lies within a predetermined time range set by a user; and controlling via the sub-control circuit during the second waiting condition, to supply the electric power to the remote control signal receiving portion, the decoder and the main control circuit, to enable the main control circuit, a receiving condition for receiving a remote control signal by the remote control signal receiving portion, as well as a decoding operation by the decoder.

15. The waiting condition setting method for a broadcast receiving apparatus, as described in the claim 14, wherein when the power button of the display apparatus is turned ON under the first waiting condition or the second waiting condition, the broadcast receiving apparatus is shifted into a normal operation supplying the power source to the display apparatus by the sub-control circuit.

* * * * *